2,831,900

PREPARATION OF 1,2,3,4,7,7-HEXACHLOROBI-CYCLO(2.2.1)-2,5-HEPTADIENE

John Ferentchak, Aurora, and Edward W. Swift, Denver, Colo., assignors to Shell Development Company, New York, N. Y., a corporation of Delaware No Drawing. Application September 12, 1955
Serial No. 533,904

4 Claims. (Cl. 260—648)

This invention relates to an improved process for the preparation of 1,2,3,4,7,7-hexachlorobicyclo-(2.2.1)-2,5-heptadiene by the dehydrohalogenation of a 5-halo-1,2,3,4,7,7-hexachlorobicyclo-(2.2.1)-2-heptene.

For the sake of convenience, throughout this specification 1,2,3,4,7,7-hexachlorobicyclo-(2.2.1)-2,5-heptadiene will be referred to as compound B and the 5-halo-1,2,3,4,7,7-hexachlorobicyclo-(2.2.1)-2-heptene will be referred to as compound A.

One of the commercially most promising insecticides developed in the last few years is the stereoisomer of 1,2,3,4,10,10 - hexachloro - 6,7 - epoxy - 1,4,4a,5,6,7,8,8a-octahydro - 1,4,5,8 - dimethanonaphthalene commonly known as Endrin. This compound is prepared by epoxidation of the Diels-Alder adduct of cyclopentadiene with compound B (U. S. 2,676,132). There is thus substantial interest in the development of efficient processes for the production of compound B.

According to U. S. Patent No. 2,676,132, compound B is prepared by dehydrohalogenating compound A with ethanolic potassium hydroxide, removing the solids and most of the alcohol from the mixture, adding a substantial amount of water, acidifying the mixture, removing most of the water and extracting the mixture with diethyl ether. The patent states that this method produces a considerable amount of dark-colored material, and that the etheric mixture develops a separation-resistant emulsion. The yield was only 78%. On an attempt at the large scale use of this process, it has been found that the alcohol removal has to be conducted very carefully in order to avoid decomposition of the product, presumably due to the high concentration of potassium hydroxide present in the mixture. This method thus is quite unsuitable for large-scale commercial preparation of compound B.

It has now been discovered that the dehydrohalogenation of compound A and isolation of compound B may be carried out in an improved manner to give a light colored product in yields of 85 to 90% or even more, by conducting the dehydrohalogenation reaction in the presence of a liquid reaction medium of a particular character, to wit: a ternary solvent comprised essentially of water, an inert neutral polar organic liquid and an inert non-polar organic liquid.

More specifically, it has been found that compound B is prepared in very high yield by reacting compound A with an alkali metal hydroxide in a liquid reaction medium comprising a minor amount of water, together with a substantial amount of each of an inert polar organic liquid and an inert non-polar organic liquid, and thereafter recovering the product, compound B, from the resulting mixture. According to one embodiment of the invention, recovery of compound B is accomplished by distilling the reaction mixture, adding additional amounts of water and/or non-polar organic liquid as necessary, until all of the polar organic liquid has been removed and there remains a mixture comprising two immiscible liquid phases: an aqueous phase containing substantially all of the inorganic salts present, and an organic liquid phase containing substantially all of the compound B present, and thereafter separating the two phases. If desired, compound B may be recovered by distillation of the solvent; however, a solution of compound B in the non-polar organic liquid may often be used to advantage directly in the preparation of Endrin.

According to another embodiment of the invention, recovery of compound B is effected by distilling the reaction mixture, adding additional amounts of non-polar organic liquid, if necessary, until all of the polar organic liquid and substantially all of the water have been removed, and thereafter removing the solid inorganic salts, as by filtration or centrifugation of the resulting mixture.

By conducting the dehydrohalogenation in this fashion, the difficulties encountered in the prior art process are avoided, and very high yields of product are obtained. Side reactions are substantially inhibited, resulting in a light-colored product, with little loss of raw materials. Decomposition of the product is almost completely prevented, due to dilution of the product in the solvent, and consequent reduction in the effective concentration of the excess alkali metal hydroxide. Also, the separation of the production is effected without the formation of intractable emulsions.

Other substantial and unexpected advantages have been obtained, as well. For example, the individual components of the ternary solvent and the relative amounts of each of these components may be so chosen that simple distillation of the final crude reaction mixture results in a condensate which is suitable as the ternary solvent for the further production of compound B according to the process described herein.

The invention provides a simple and effective method for preparing compound B, and thus contributes materially to the art.

The essence of the invention lies in the nature of the reaction medium employed, the chemical and physical characteristics of the components of that medium and the relative proportions of such components being essential to the attainment of the desired objectives.

The essential components of the ternary solvent have been found to be three, i. e., (a) Water;
(b) An inert liquid neutral polar organic compound;
(c) An inert liquid non-polar organic compound.

By "inert neutral polar organic compound" is meant an organic liquid compound which is substantially inert in the reaction system, which is substantially non-acidic or non-basic in its water solutions, which is a solvent for compound A and for an alkali metal hydroxide and which has an electric dipole moment of at least 0.5 Debye units and preferably at least 1.0 Debye units. By the term "Debye unit" is meant that measurement of electric dipole moment normally given this name. One Debye unit is defined to equal $1 \times 10^{-18}$ electrostatic units. As used in this specification, the term "electric dipole moment" has its usual meaning—e. g., it is a description or measure of the magnitude of the dipolar electrostatic field existing in a given organic compound, the magnitude of the moment being the product of either of the two (opposite) electrostatic charges and the distance between those charges. Further, the term "electric dipole moment" is herein used to mean the electric dipole moment of a compound which is in the pure liquid state or is dissolved in a suitable solvent, the value of the moment being determined for the compound or solution at ordinary temperatures—e. g., about 20 to 25° C. The value(s) of such dipole moment(s) for given organic compounds in the pure form or in representative solvent are given in such compilations of physical data as "Tables of Electric Dipole Moments," compiled by L. G. Wesson, The Technology Press (1948).

In general, suitable inert neutral polar organic liquids are the organic liquids at least substantially miscible with water. It is preferred that the solvent be completely miscible with water. Liquid organic compounds meeting these requirements are primarily the oxygenated organic compounds whose water solutions are substantially neutral—i. e., whose pH is substantially 7.0. Examples of this class of materials include both mono- and polyhydric aliphatic alcohols, including the straight-chain, branched chain and cyclic configurations of these compounds. Also suitable are heterocyclic oxygenated organic compounds, such as dioxane, for example. It is preferred that the polar organic liquid have a boiling point not substantially above the boiling point of water—i. e., that the polar liquid has a boiling point below about 150° C. at atmospheric pressure. The polar liquid used should be a good solvent for an alkali metal hydroxide, and also be a good solvent for compound A. A preferred class of polar liquids meeting this requirement are the lower aliphatic alcohols, preferably those having from 1 to about 4 carbon atoms.

By "inert non-polar organic liquid compounds" is meant any organic liquid compound which is substantially inert in the reaction system which is a good solvent for compound B and which has an electric dipole moment (as defined hereinbefore) of substantially zero Debye units, i. e., of less than 0.5 Debye unit. Preferably, the non-polar organic liquid is substantially immiscible with water, but is substantially miscible with the polar liquid used. Of greatest applicability are the various unsubstituted hydrocarbons.

Hydrocarbons which may be employed include aliphatic hydrocarbons, such as the unsubstituted straight-chain hydrocarbons, pentane, hexane, and the like; unsubstituted branched-chain hydrocarbons, such as isopentane, 2,2-dimethylpropane, 2-methylpentane, 2,2- and 2,3-dimethylbutene, 2,2- and 2,4-dimethylpentane, and the like; and unsubstituted cyclic hydrocarbons, such as cyclopentane, cyclohexane, and cyclooctane. There also may be employed unsubstituted aromatic hydrocarbons, such as benzene, and alkyl-substituted aromatic hydrocarbons, such as toluene or xylene. Mixtures of these compounds — straight-chain, branched-chain, cyclic or aromatic—such as are found in gasoline or other petroleum fractions may also be used. It is preferred that the non-polar liquid employed be an unsubstituted straight-chain hydrocarbon such as pentane, hexane, or a homolog of these hydrocarbons. The boiling point of the non-polar liquid should not be substantially greater than that of water—i. e., not above about 150° C. The non-polar liquid chosen must be a good solvent for compound B, but should be a poor solvent for inorganic salts.

The relative amounts of the three components of the ternary solvent may be varied rather widely. However, if the full advantages obtained through the use of the ternary solvent are to be realized, the composition of the solvent must be within certain limits. It has been found that the presence of at least a small amount of water is essential, but that the amount of water should not exceed about 15% by weight of the solvent. The water content of the ternary mixture must not be below about 0.1% by weight of the mixture, and preferably, the water content of the mixtures is from about 0.5% to about 6% by weight thereof.

The ternary mixture must contain at least about 10% by weight of the polar liquid—preferably at least 25%—but the fraction of polar liquid should not substantially exceed about 40% by weight of the total mixture.

The concentration of non-polar liquid in the mixture will be determined by the concentration of water and polar solvent, respectively, therein. It is preferred that the concentration of non-polar liquid be at least 45% by weight of the mixture but that it not exceed about 89% by weight of the mixture.

It is preferred that such polar and non-polar liquids be chosen that the ternary mixture is homogeneous under the reaction conditions used. It is also preferred that the polar and non-polar liquids used and the respective amounts of such liquids and water be so chosen that distillation of the final crude reaction mixture (which mixture includes the product (compound B) and the alkali metal hydroxide used as the dihydrohalogenating agent) result in a condensate which is a ternary mixture suitable as the reaction medium, as set out hereinbefore. It is further preferred that the boiling point of the liquid reaction medium lie within the range of temperatures at which the dehydrohalogenation reaction is conducted—i. e., within the range of from about 50° C. to about 200° C.

The dehydrohalogenation to compound B is carried out by mixing compound A with the ternary solvent, heating the mixture to a moderately elevated temperature and agitating the heated mixture with an alkali metal hydroxide. The product is then recovered in a manner hereinafter described in detail.

Compound A has heretofore been defined as a 5-halo-1,2,3,4,7,7-hexachlorobicyclo(2.2.1)-2-heptene. The 5-halo atom may be any halogen atom, but it is preferred that it be a middle halogen—i. e., a bromine or chlorine atom.

As the alkali metal hydroxide, there may be used the hydroxide of any member of group IA of the periodic chart of the elements (Merck and Co. Inc., revised, 1955). Sodium and potassium hydroxides are preferred members of this group, since they are widely available and relatively inexpensive. The amount of alkali metal hydroxide used should be at least one mole per mole of compound A charged, and it is preferable that a substantial excess of the hydroxide be present. In the usual case, it has been found advantageous to use at least two moles of hydroxide per mole of compound A, and preferably from about 2.5 to about 5 moles of hydroxide per mole of compound A are used. Little additional advantage is realized by exceeding 6 moles of hydroxide per mole of compound A.

The reaction is carried out at moderately elevated temperatures—i. e., at temperatures within the range of from about 50° C. to about 200° C., preferably about 100° C. to about 150° C.

The reaction is normally carried out at slightly elevated pressures, to maintain the reaction mixture in liquid state. In general, pressures of from about 30 p. s. i. g. to 150 p. s. i. g. are sufficient.

The amount of the ternary mixture used should be sufficient to maintain a substantial proportion of the components of the reaction mixture in solution. For this purpose it is desirable that there be used a weight of solvent approximately equal to the weight of compound A charged, although in some cases somewhat less or somewhat more solvent may be used. In general, the weight ratio of solvent to compound A should be at least 0.5 to 1, but need not exceed about 5 to 1; a ratio of from about 0.75 to 1 to about 2 to 1 is preferred.

According to this invention, isolation of the production is effected by either one of two techniques. According to the first technique, the reaction mixture is distilled until all of the polar liquid has been removed, additional water and non-polar liquid being added if necessary, so that there is ultimately obtained a mixture of two immiscible liquid phases—an aqueous phase containing unreacted alkali metal hydroxide and alkali metal halide, and an organic liquid phase containing the product compound B. Recovery of compound B is then effected by separating the two phases, discarding the aqueous phase and distilling of the non-polar liquid from the organic liquid phase.

According to an alternate technique, the reaction mixture is distilled until all of the polar liquid and substantially all of the water have been removed, additional non-polar liquid being added if necessary to maintain a dilute solution of the product. The resulting mixture of solid alkali metal halide and hydroxide is then removed by filtration or centrifugation and the product recovered by removal of the non-polar liquid by distillation.

Selection of the non-polar and polar liquids and control of the relative amounts thereof and of the water so that distillation of the crude reaction mixture gives a condensate suitable as the ternary solvent, for use in further operation of the new process is preferred since it permits direct recycle of the condensate without additional intervening treatment thereof.

By conducting the hydrogenation reaction and recovering the product according to this method, the yield of compound B is 90% or even more, based on the amount of compound A charged; further, the reaction requires only about 1 to 2 hours reaction time, as compared to 4 hours or more heretofore required, the product is easily obtained without formation of intractable emulsions, and is substantially uncontaminated with undesirable side reaction products.

The nature of the invention is further illustrated by the following description of particular applications thereof.

EXAMPLE I

A ternary solvent of 39% by weight isopropyl alcohol, 2.1% by weight water and 58.9% n-heptane was prepared. This mixture approximates the composition of the ternary azeotrope of this system at a pressure of 630 millimeters mercury pressure. (The system: water-heptane-isopropyl alcohol at this pressure forms an azeotrope which has the composition: 8% by weight water, 59% by weight heptane, 33% by weight isopropyl alcohol.) Compound A and flaked sodium hydroxide containing about 5% by weight water, in the molar ratio of 1 to 3.5 were added to the solvent, the weight ratio of compound A to liquid mixture being 1 to 1.31. The reaction was effected by heating the resulting mixture to 103–107° C., the pressure being maintained at 30–35 p. s. i. g., the mixture being constantly stirred, and maintaining these conditions for about 6 hours.

The mixture was then distilled to remove all of the isopropyl alcohol in the form of a ternary mixture of isopropyl alcohol, n-heptane, and water, additional n-heptane being added at the rate it was removed, and sufficient additional water being added to provide an aqueous phase equal in volume to the n-heptane phase. The two phases were separated by a combination of centrifugation and decantation. The heptane was then evaporated from the organic phase to give a yield of compound B of 92.2%, based on the number of moles of compound A charged.

EXAMPLE II

The experiment of Example I was repeated. The product was recovered as follows: The reaction mixture was distilled to remove all of the isopropyl alcohol and the water as a ternary mixture with n-heptane, n-heptane being added at the rate it was removed by distillation so that the final product was a n-heptane solution of compound B containing suspended solid inorganic salts. The mixture was filtered and the filter cake washed thoroughly with fresh n-heptane, the washings being combined with the filtrate. Distillation of the heptane from the filtrate gave substantially the same yield of compound B as was obtained in Example I. The condensate obtained from the distillation of the reaction mixture had substantially the same composition as the ternary solvent charged.

EXAMPLE III

The experiment of Example I was repeated, with the exception that during the reaction the reaction mixture was allowed to distill slowly, additional n-heptane and isopropyl alcohol also being added slowly to make up for the n-heptane and isopropyl alcohol removed on distillation. The rate of distillation was controlled to maintain the water concentration in the ternary mixture at 2% by weight until just before the reaction was terminated, when all of the water and isopropyl alcohol were removed. By maintaining the water concentration at this low level, the reaction time was reduced about 40%.

EXAMPLE IV

The experiment of Example I was repeated, using a weight ratio of compound A to ternary solvent of 1 to 1. The yield of compound B was substantially the same as that obtained in Example I.

EXAMPLE V

The experiment of Example I was repeated twice, using a reaction temperature of 132° C. and pressure of 65 p. s. i. g., and a sodium hydroxide to compound A weight ratio of 3 to 1. A 90% yield of compound B was obtained with but 2 hours and 1½ hours reaction time, respectively.

Repetition of the experiment at a temperature of 160° C. and 100–104 p. s. i. g. for 45 minutes gave a yield of approximately 90%.

EXAMPLE VI

Dehydrohalogenation of compound A was accomplished according to the method of Example I. The composition of the reaction medium was the only factor changed. The results appear in Table I.

Table I

| Run No. | Solvent Charge, Percent W. | | | Reaction Conditions | | | Yield of Compound B, Percent M. |
|---|---|---|---|---|---|---|---|
| | Isopropyl Alcohol | Water | Heptane | Temp., °C. | Pressure, p. s. i. g. | Time, hr. | |
| 1 | None | None | 100 | 88–95 | 7–11 | 6 | Negligible. |
| 2 | 10 | None | 90 | 91–93 | 12 | 6 | <5. |
| 3 | 10 | 10 | 80 | 91–93 | 18–20 | 6 | <5. |
| 4 | 39 | 0.2–4.0 | 60.8–57 | 131–133 | 58–63 | 1.5 | >90. |
| 5 | 39 | 6.0 | 55 | 131–133 | 58–63 | 1.5 | 87. |
| 6 | 39 | 8.0 | 53 | 131–133 | 58–63 | 1.5 | 86. |
| 7 | 30 | 2 | 68 | 131–133 | 58–63 | 1.5 | 92. |
| 8 | 27 | 2 | 71 | 131–133 | 58–63 | 1.5 | 87. |
| 9 | 25 | 2 | 73 | 131–133 | 58–63 | 1.5 | 88. |
| 10 | 20 | 2 | 78 | 131–133 | 58–63 | 1.5 | 77. |

This data shows that:

(a) Permissible water concentrations are limited to the range of from about 0.2 by weight to about 4% by weight of the mixture.

(b) At least 30% by weight of isopropyl alcohol in the ternary mixture is necessary.

We claim as our invention:

1. A process for preparing 1,2,3,4,7,7-hexachlorobicyclo-(2.2.1)-2,5-heptadiene which comprises heating a 5 - halo - 1,2,3,4,7,7 - heptachlorobicyclo - (2.2.1) - 2-heptene with an alkali metal hydroxide in the presence of a ternary solvent comprising water, a liquid aliphatic alcohol having 1 to 4 carbon atoms per molecule and a liquid hydrocarbon free from aliphatic unsaturation, the water content of said solvent mixture being about 0.1% to about 15% by weight, the alcohol content being at least about 10% but not substantially exceeding about 40% by weight and the remainder being said liquid hydrocarbon.

2. A process for preparing 1,2,3,4,7,7-hexachlorobicyclo-(2.2.1)-2,5-heptadiene which comprises heating a 5 - halo - 1,2,3,4,7,7 - heptachlorobicyclo - (2.2.1) - 2-heptene with an alkali metal hydroxide in the presence of a ternary solvent comprising water, a liquid aliphatic alcohol having 1 to 4 carbon atoms per molecule and a liquid saturated aliphatic hydrocarbon in the proportions of about 0.1% to about 15% by weight water, at least about 10% but not substantially exceeding about 40% by weight of said alcohol, and at least 45% but not exceeding about 89% by weight of said hydrocarbon, distilling the mixture to remove substantially all of said alcohol, adding additional amounts of water and said hydrocarbon, as necessary to give a final mixture comprising an aqueous phase and a water immiscible phase comprising said non-polar organic liquid and 1,2,3,4,7,7-hexachlorobicyclo-(2.2.1)-2,5-heptadiene, and separating the aqueous phase and the non-aqueous phase.

3. A process for preparing 1,2,3,4,7,7-hexachlorobicyclo-(2.2.1)-2,5-heptadiene which comprises heating a 5 - halo - 1,2,3,4,7,7 - heptachlorobicyclo - (2.2.1) - 2-heptene with an alkali metal hydroxide in the presence of a ternary solvent comprising water, a liquid aliphatic alcohol having 1 to 4 carbon atoms per molecule and a liquid saturated aliphatic hydrocarbon in the proportions of about 0.1% to about 15% by weight water, at least about 10% but not substantially exceeding about 40% by weight of said alcohol, and at least 45% but not exceeding about 89% by weight of said hydrocarbon, distilling the mixture in the presence of an excess of said liquid aliphatic hydrocarbon to remove substantially all of said water and said alcohol, thereby producing a solution of 1,2,3,4,7,7-hexachlorobicyclo-(7.2.1)-2,5-heptadiene in said hydrocarbon.

4. The process of claim 3 wherein the 5-halo-substituent is a chlorine atom, the alkali metal hydroxide is sodium hydroxide, the alcohol is isopropyl alcohol and the hydrocarbon is heptane.

References Cited in the file of this patent
UNITED STATES PATENTS
2,676,132    Bluestone _____ Apr. 20, 1954